(12) United States Patent
Murotani et al.

(10) Patent No.: US 6,912,720 B2
(45) Date of Patent: Jun. 28, 2005

(54) DISK DEVICE

(75) Inventors: Kiichiro Murotani, Tokyo (JP); Kei Shirahata, Tokyo (JP); Kazutoshi Taniguchi, Tokyo (JP); Takashi Kuzuu, Tokyo (JP); Shoji Tatehata, Tokyo (JP); Eiji Sasaki, Tokyo (JP); Tetsurou Nagami, Tokyo (JP); Hisashi Morita, Tokyo (JP); Nao Watanabe, Tokyo (JP); Takeshi Inatani, Tokyo (JP); Masaaki Takeshima, Tokyo (JP); Eiji Niikura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 202 days.

(21) Appl. No.: 10/432,235

(22) PCT Filed: Oct. 24, 2001

(86) PCT No.: PCT/JP01/09346

§ 371 (c)(1),
(2), (4) Date: May 22, 2003

(87) PCT Pub. No.: WO03/036637

PCT Pub. Date: May 1, 2003

(65) Prior Publication Data

US 2004/0013006 A1 Jan. 22, 2004

(51) Int. Cl.⁷ .............................................. G11B 17/04

(52) U.S. Cl. ...................................................... 720/619
(58) Field of Search ................................ 720/619, 607, 720/622; 360/99.02, 99.03, 99.07

(56) References Cited

U.S. PATENT DOCUMENTS

| 4,352,132 A | * | 9/1982 | Gyi .......................... 360/99.07 |
| 5,144,612 A | * | 9/1992 | Isobe et al. ................. 720/607 |
| RE38,548 E | * | 7/2004 | Min et al. ..................... 360/95 |

FOREIGN PATENT DOCUMENTS

| JP | 63-98867 A | | 4/1988 |
| JP | 5-347058 A | | 12/1993 |
| JP | 06162643 A | * | 6/1994 |
| JP | 8-31071 A | | 2/1996 |

* cited by examiner

Primary Examiner—Tianjie Chen
(74) Attorney, Agent, or Firm—Birch, Stewart, Kolasch & Birch, LLP

(57) ABSTRACT

A disk device in which a precut portion of sub cam plate and a protruding portion of locking plate are made in a slanted shape and at the same time the sub cam plate is rotated by a pressure when the protruding portion is inserted into the precut portion.

5 Claims, 16 Drawing Sheets

DISK DEVICE

This application is the national phase under 35 U.S.C. §371 of PCT International Application No. PCT/JP01/09346 which has an International filing date of Oct. 24, 2001, which designated the United States of America.

TECHNICAL FIELD

The present invention relates to a disk device by which two kind of disk operating modes can be realized by means that a lever performs two kind of operations.

BACKGROUND ART

There has been a disk device which controls operation of a lever of two overlaid type cam in order to make enable to selectively realize a disk changing mode in which an arbitrary disk is selected from a plurality of disks and exchanged, and a disk playing mode in which an arbitrary disk is inserted into a slot and reproduced.

In the disk device in the prior art technology, a disk member which has a U shaped precut portion, and a locking lever which engages with a cam groove formed on the disk member to operate, are provided with a slidable locking plate which engages with precut portion of the disk member to regulate a rotating movement.

Hereinafter operation of the disk device will be explained.

When the locking plate is slid to engage with the precut portion of disk member in a state the precut portion of disk member stops a position where it engages with the locking plate, rotating movement of the disk member is regulated. On the other hand the locking lever is released from an engagement by the slid locking plate, and moves along a cam groove on the disk member.

Because disk device in the prior art technology is constituted as described above, the locking plate can be slid and engaged with precut portion of the disk member when the disk member stops accurately at a predetermined rotated position, however, there has been a problem that the locking plate cannot be inserted into the precut portion of disk member in a case when a stopping position of the disk member is shifted even in a little bit from the predetermined position.

The present invention has been made to solve the above described problem and it is an object of the invention to provide a disk device in which a protruding portion at a tip of the locking plate can be inserted into the precut portion to release an engaging state of the locking lever even when the stopping position of a sub cam plate is shifted from a predetermined rotated position.

DISCLOSURE OF THE INVENTION

A disk device in accordance with the present invention is characterized by that a precut portion of the sub cam plate and a protruding portion of the locking plate are made in a slanted shape and at the same time the sub cam plate is rotated by a pressure when the protruding portion is inserted into the precut portion.

By this arrangement an effect is produced that the protruding portion at a tip of the locking plate can be inserted into the precut portion to release an engaging state of the locking lever even when a stopping position of the sub cam plate is shifted from a predetermined rotated position as far as it is located within an area where the tip portion of protruding portion of the locking plate can abut onto a slanted edge of the precut portion of sub cam plate.

The disk device in accordance with the present invention is characterized by that a stopping position of the sub cam plate is set such that a tip portion of the protruding portion is located at a central area of cut portion of the precut portion.

By this arrangement an effect is produced that the area where the protruding portion can be inserted into the precut portion, can be expanded.

The disk device in accordance with the present invention is characterized by that precut portion of the sub cam plate is made by cutting in a triangle shape, and the tip portion of protruding portion of the locking plate is made in a shape of acute angle.

By this arrangement an effect is produced that the area where the protruding portion can be inserted into the precut portion, can be expanded without including complicated constitution.

The disk device in accordance with the present invention is characterized by that a urging member which urges a rotating movement of the sub cam plate in a direction that is opposite to a pressure when the protruding portion is inserted into the precut portion.

By this arrangement an effect is produced that a protruding portion at a tip of the locking plate can be inserted into the precut portion to release the engaging state of locking lever even when a stopping position of the sub cam plate is shifted from a predetermined rotated position as far as it is located within an area where the tip portion of protruding portion of the locking plate can abut onto a slanted edge of the precut portion of sub cam plate.

The disk device in accordance with the present invention is characterized by that the urging member is constituted by a spring, and one end of the spring is firmly fixed onto the main cam plate and another end of the spring is firmly fixed onto the locking plate.

By this arrangement an effect is produced that the area where the protruding portion can be inserted into the precut portion, can be expanded without including complicated constitution.

BEST MODE FOR CARRYING OUT THE INVENTION

For explaining the present invention in more detail, a best mode for carrying out the invention will be described hereinafter with reference to the accompanied drawings.

Embodiment 1

Figure 1:
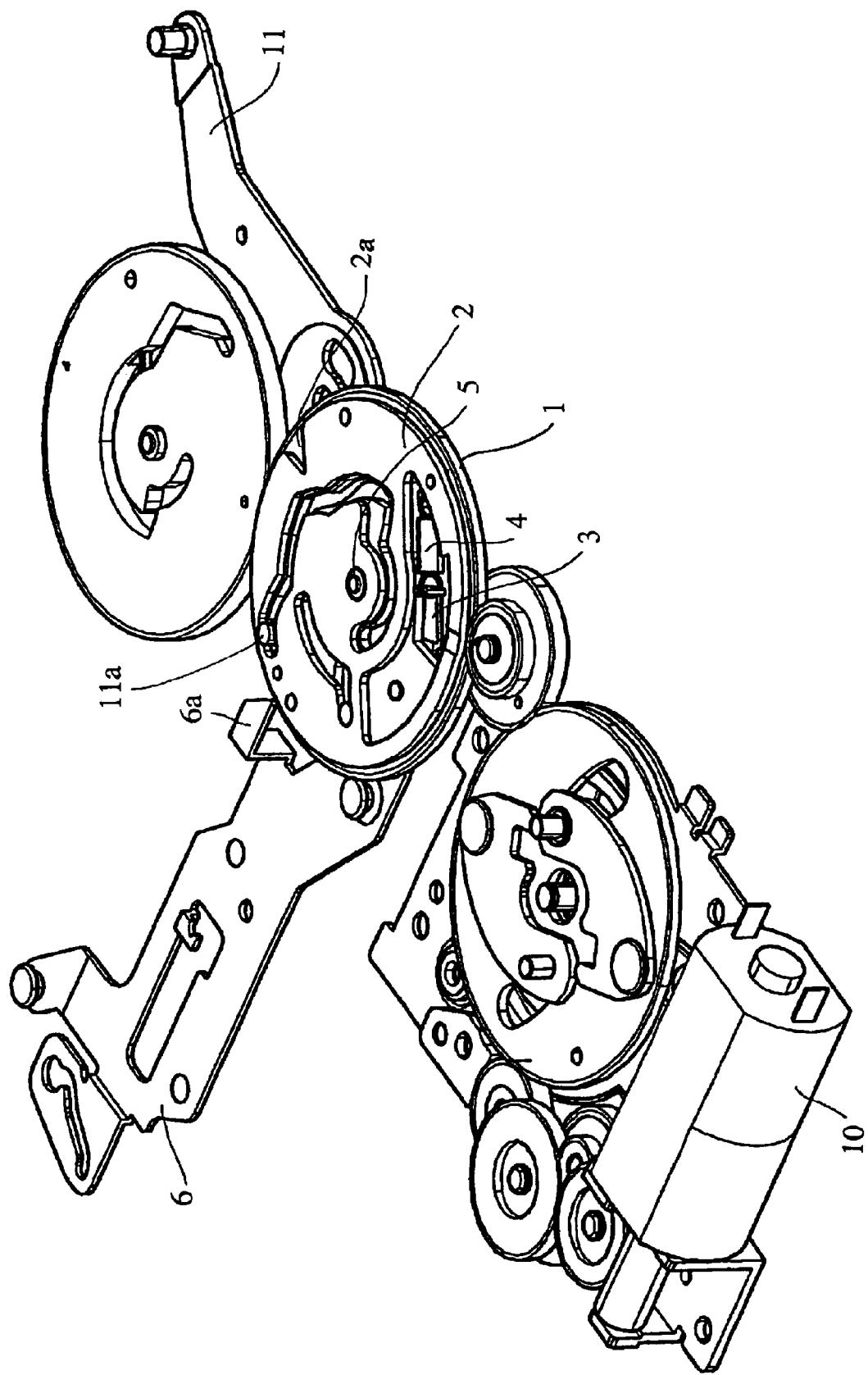
FIG. 1 is a perspective view to show a relevant part of disk device according to embodiment 1 of the present invention.
Figure 2:
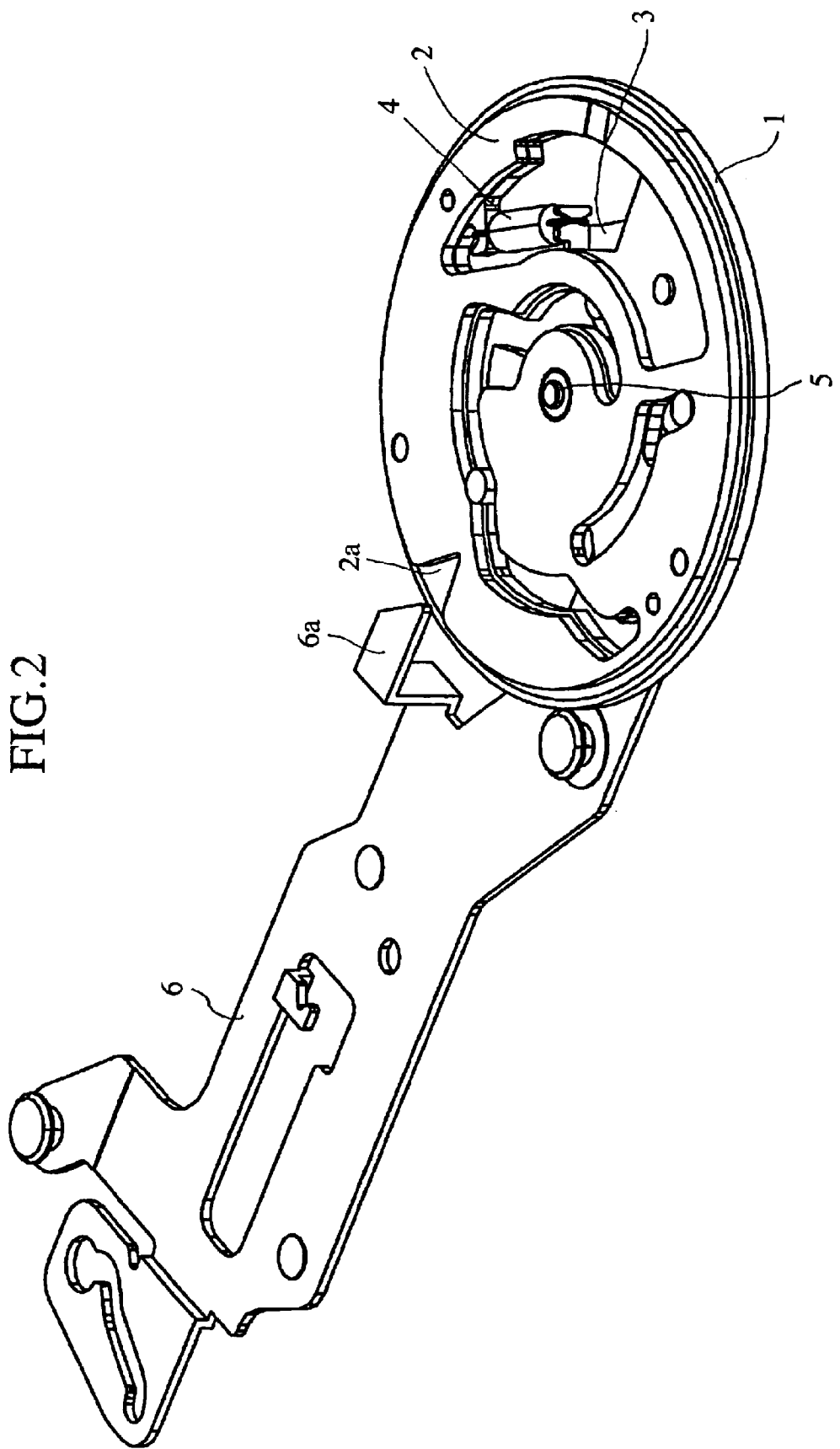
FIG. 2 is a perspective view to show a two overlaid type disk cam portion.
Figure 3:
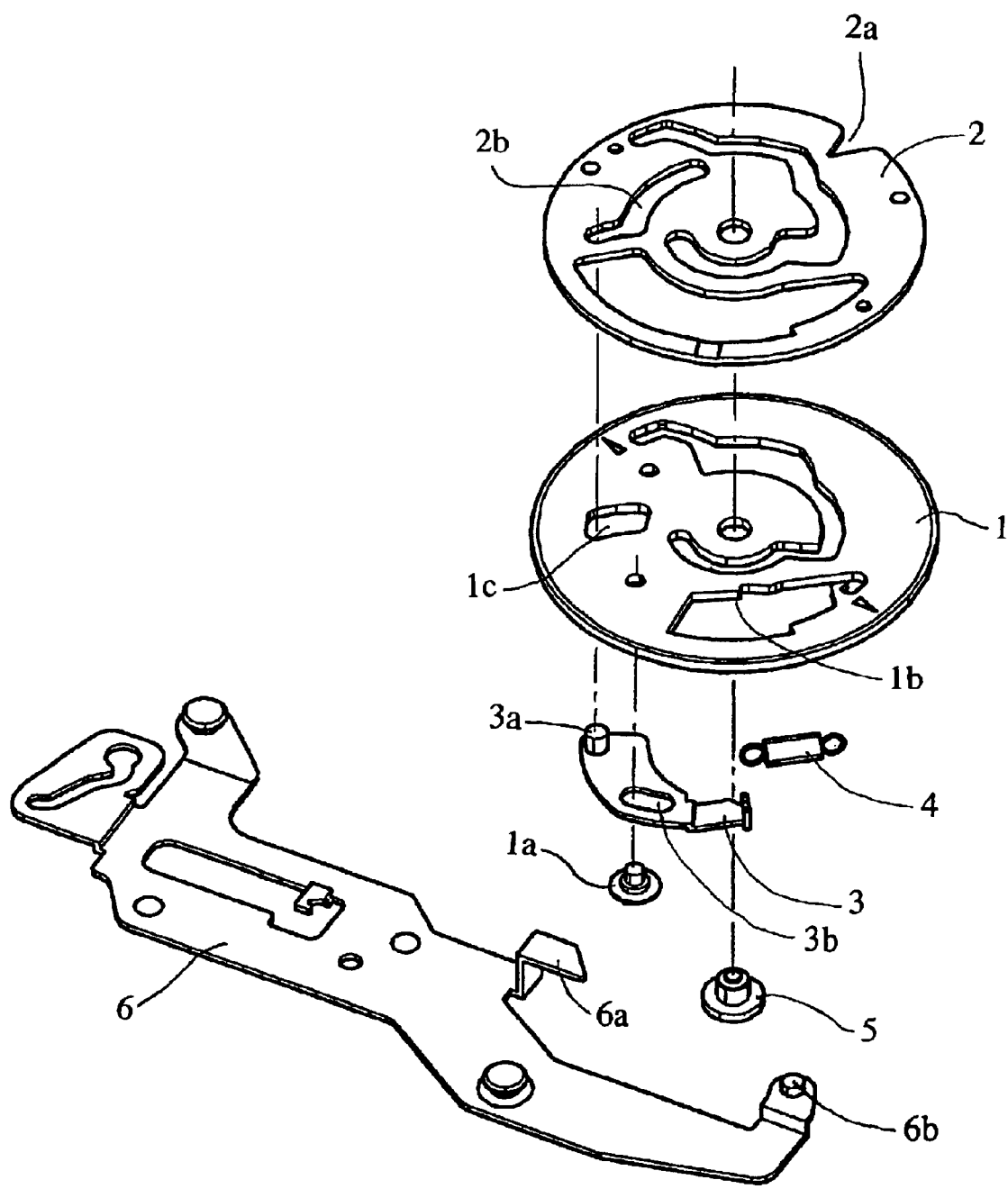
FIG. 3 is an exploded view to show the two overlaid type disk cam portion.

FIG. 1 is a perspective view to show an relevant part of disk device according to embodiment 1 of the present invention, FIG. 2 is a perspective view to show a two overlaid type disk cam portion and FIG. 3 is an exploded view to show the two overlaid type disk cam portion.

In the drawings a reference numeral 1 designates a main cam plate which is rotated by a motor 10, 2 designates a sub cam plate which is rotatably supported on the same axis with the main cam plate 1 and a precut portion 2a is formed on a circumference thereof, 3 designates a locking lever (engaging means) which makes the main cam plate 1 and the sub cam plate 2 to be engaged with each other, 4 designates a spring (urging member) which urges the sub cam plate 2 in a direction that is opposite to a pressure when a protruding portion 6a is inserted into the precut portion 2a, 5 designates a central axis to support the main cam plate 1 and the sub cam plate 2, 6 designates a locking plate which makes the protruding portion 6a inserted into the precut portion 2a of the sub cam plate 2 to release an engaging state of the locking lever 3 when the sub cam plate 2 stops at a predetermined rotated position, 10 designates the motor (driving means) to drive the main cam plate 1, 11 designates a lever which rotates with a rotating movement of the main cam plate 1 or the sub cam plate 2 by the locking lever 3.

Hereinafter an operation of embodiment 1 will be explained.

On the main cam plate 1, the locking lever 3 is rotatably fixed by a pin 1a to lock the rotating movement with the sub cam plate 2, and a pin 3a of the locking lever 3 engages with a cam groove 2b on the sub cam plate 2.

The locking lever 3 is provided with a hole 3b which has a shape of oblong hole, and the locking lever is urged to one side by the spring 4, thereby the main cam plate 1 and the sub cam plate 2 are clamped by the same central axis 5.

The locking plate 6 is provided with a protruding portion 6a to engage with the precut portion 2a of sub cam plate 2 and a pin 6b to operate the locking lever 3.

Figure 4:
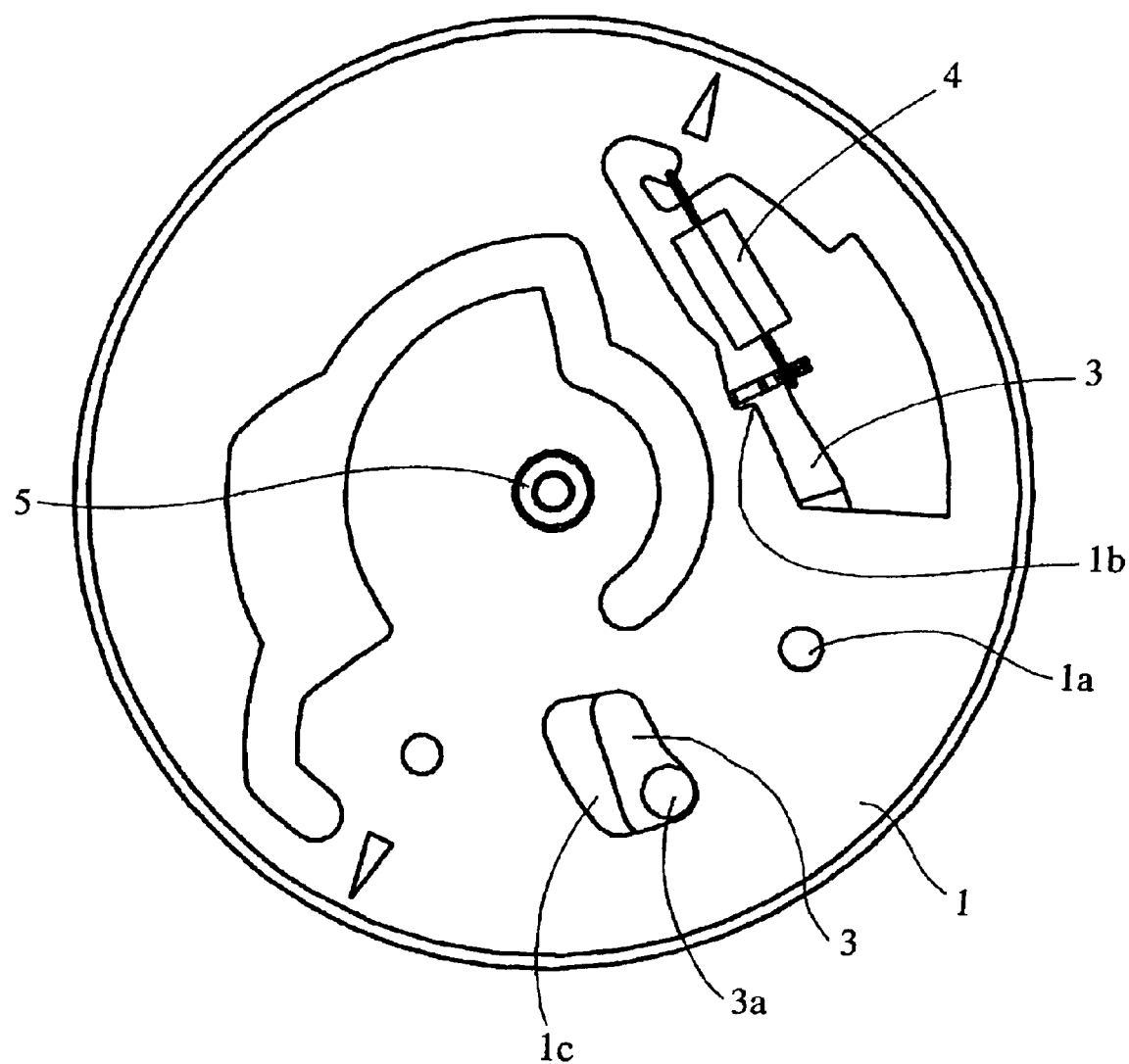
FIG. 4 is an explanatory diagram to show a state that a sub cam plate is locked.
Figure 5:
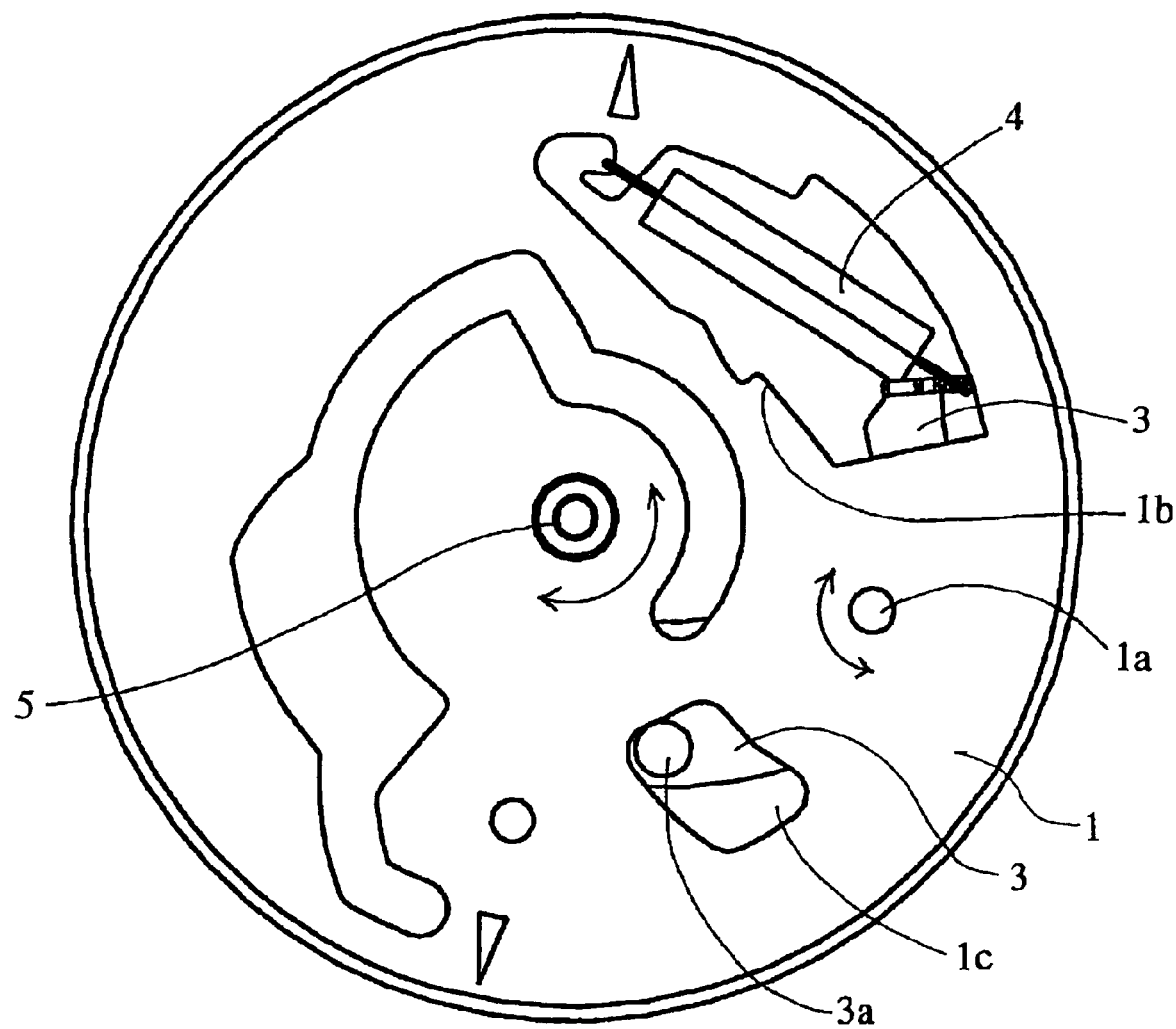
FIG. 5 is an explanatory diagram to show a state that the sub cam plate is released from a locked state.

FIG. 4 and FIG. 5 show a relation between the main cam plate 1 and the locking lever 3, especially FIG. 4 shows a state that the sub cam plate 2 is locked and FIG. 5 shows a state that the sub cam plate is released from the locked state.

Typically the locking lever 3 is urged to one side by the spring 4 as depicted in FIG. 4, and it is located in a position where the pin 3a abuts onto one wall of a hole 1c in the main cam plate 1 with the pin 1a as a rotating center. And the locking lever 3 engages with a protruding portion 1b on the main cam plate 1 and thereby a rotating movement of the locking lever 3 around the central axis 5 as a center is regulated.

When a locking is released by an action of the locking lever 6 (a detail will be described later), the locking lever 3 rotates around the central axis 5 as a center and at the same time it rotates around the pin 1a as a center as depicted in FIG. 5.

Figure 6:
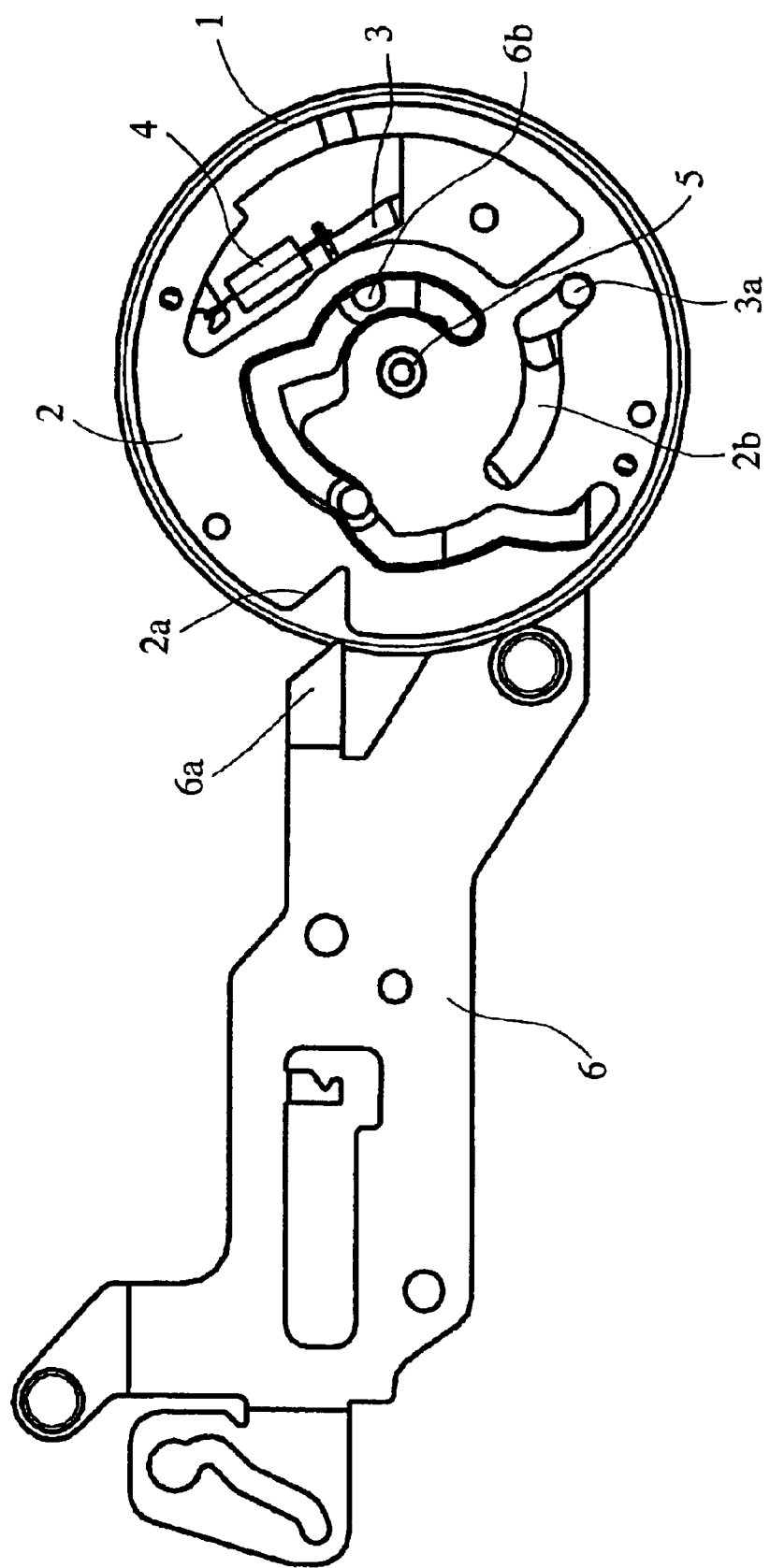
FIG. 6 is an explanatory diagram to show a state that a straight edge of protruding portion of the locking plate and a precut portion of the sub cam plate are aligned along a line.
Figure 7:
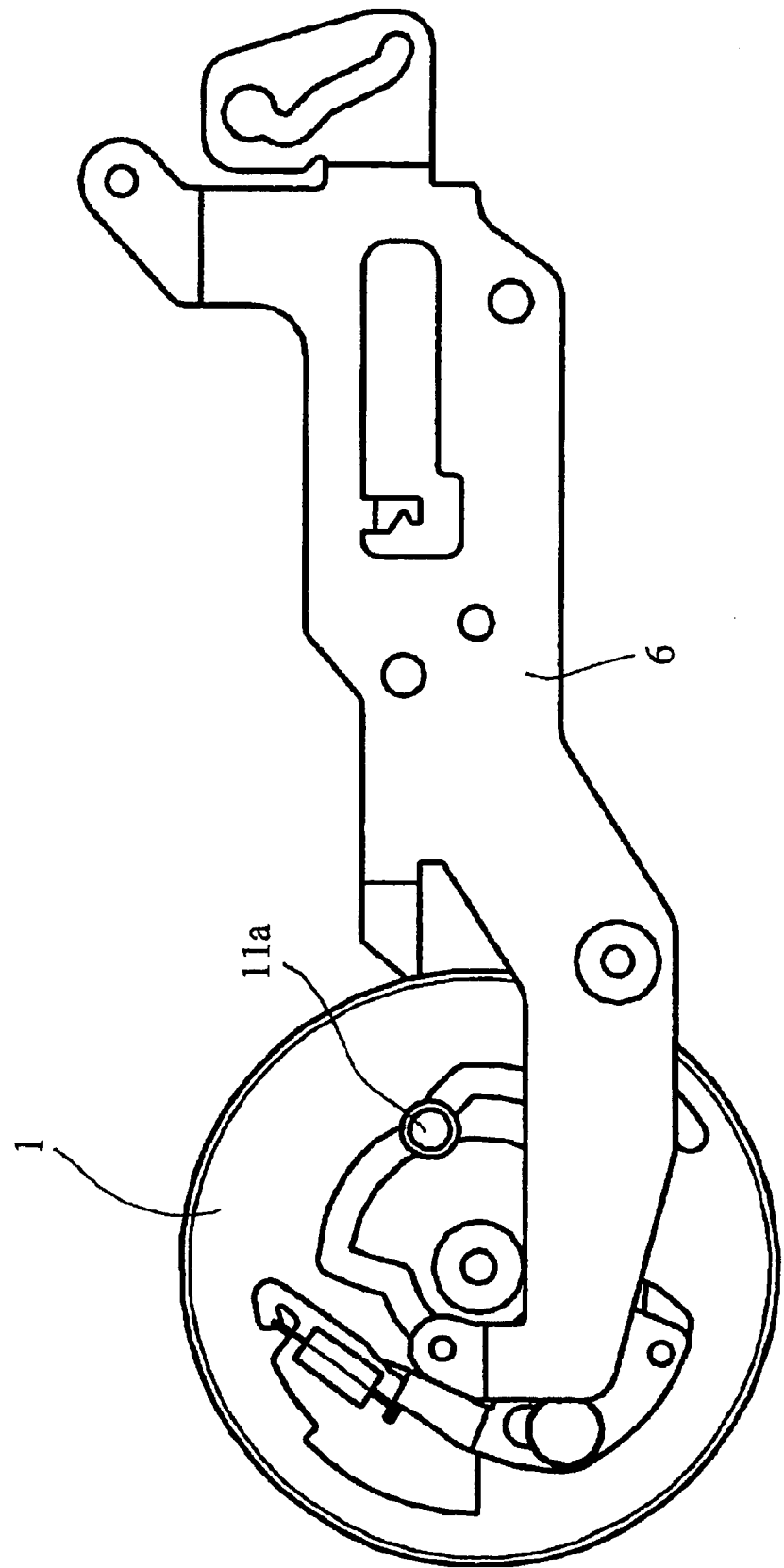
FIG. 7 is an explanatory diagram to show the state depicted in FIG. 6 when viewed from a back side.
Figure 8:
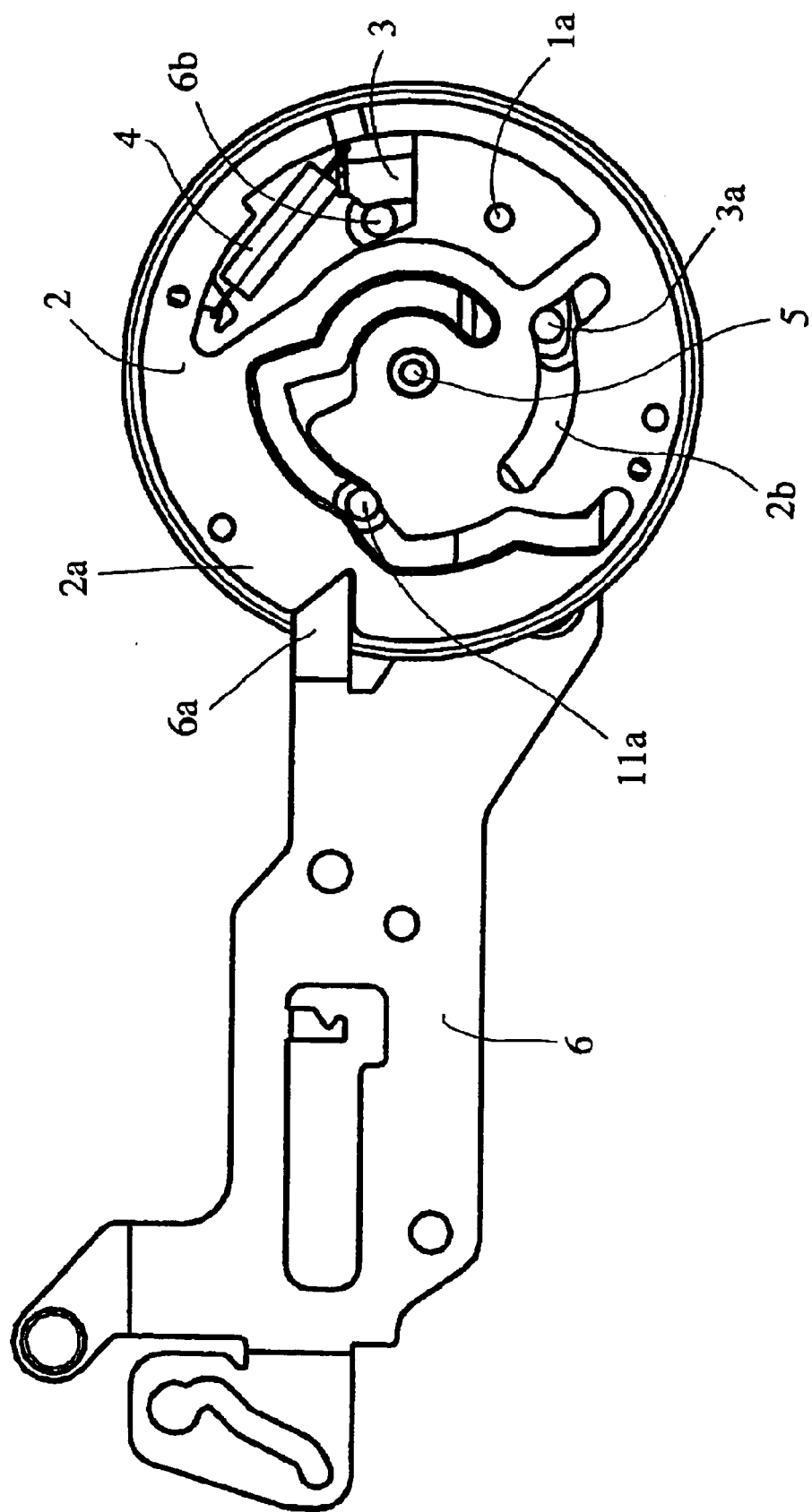
FIG. 8 is an explanatory diagram to show a state that the locking plate is slid and engaged with the sub cam plate from the state depicted in FIG. 6.
Figure 9:
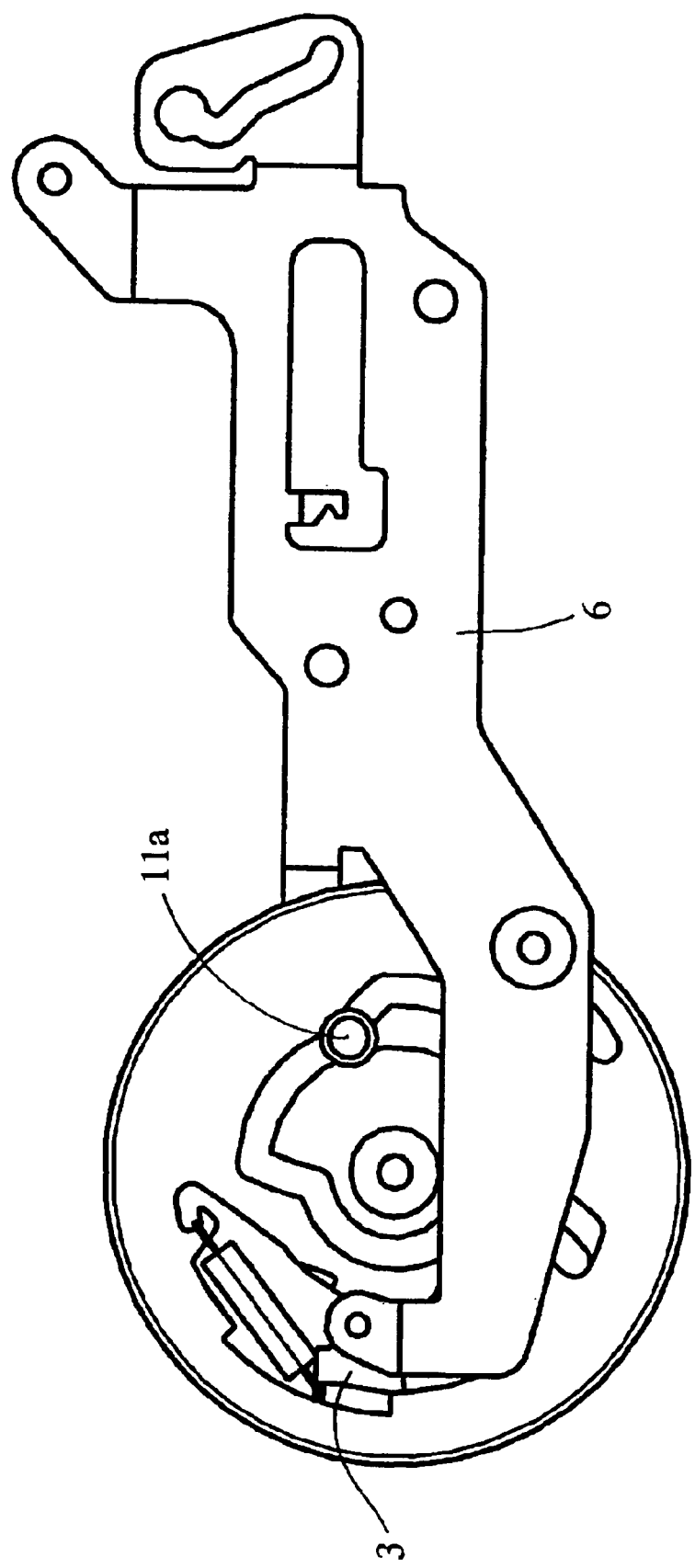
FIG. 9 is an explanatory diagram to show the state depicted in FIG. 8 when viewed from the back side.

At this point FIG. 6 shows a state that a straight edge of the protruding portion 6a of locking plate 6 and precut portion 2a of the sub cam plate 2 are aligned along a line, and FIG. 7 shows a back side of the state depicted in FIG. 6. And FIG. 8 shows a state that the locking plate 6 is slid and engaged with the sub cam plate 2, and FIG. 9 shows a back side of the state depicted in FIG. 8.

In the state depicted in FIG. 6, a rotating movement of the sub cam plate 2 around the central axis 5 as a center is not caused even when the locking plate 6 is slid, and only a rotating movement of the locking lever 3 is performed around the pin 1a as a center by pin 6a of the locking plate 6.

Because the pin 3a is moved to a concentric portion of the cam groove 2b by this rotating movement, an engagement between the sub cam plate 2 and the main cam plate 1 is released. At this point the sub cam plate 2 is in a state to stop the rotating movement and only the main cam plate 1 becomes rotatable within the concentric portion of cam groove 2b.

Figure 10:
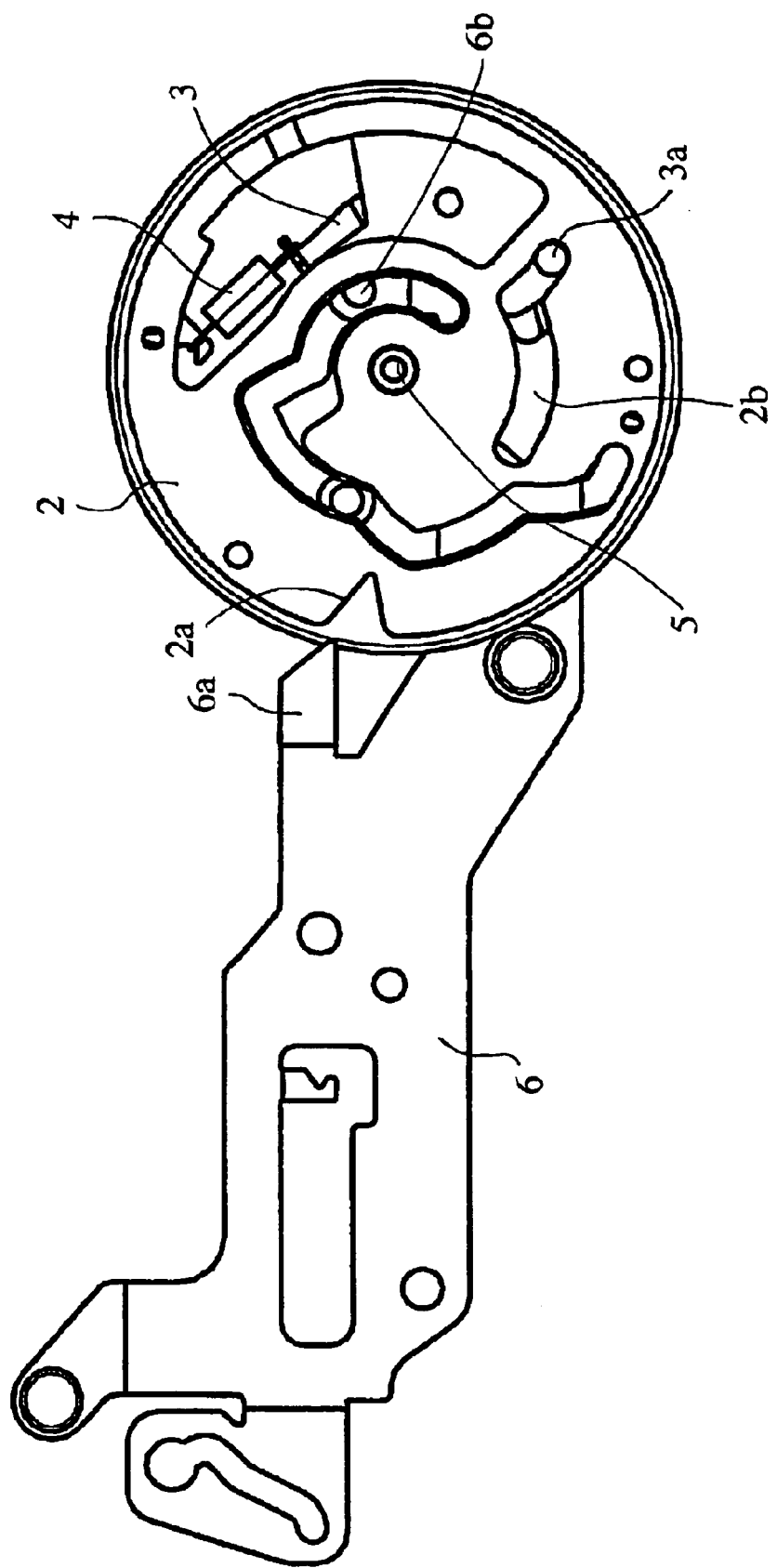
FIG. 10 is an explanatory diagram to show a state that a slanted edge of protruding portion of the locking plate and the precut portion of sub cam plate are aligned along a line.
Figure 11:
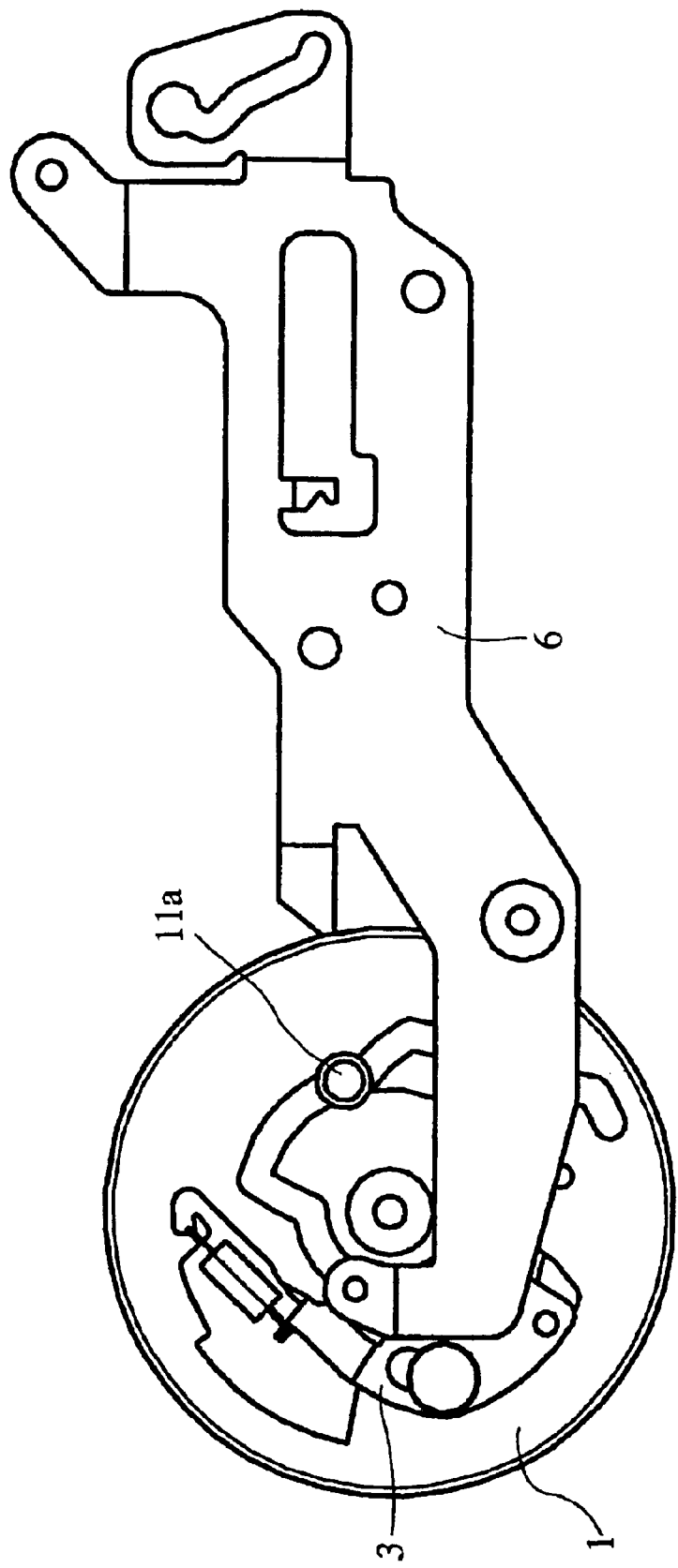
FIG. 11 is an explanatory diagram to show the state depicted in FIG. 10 when viewed from the back side.
Figure 12:
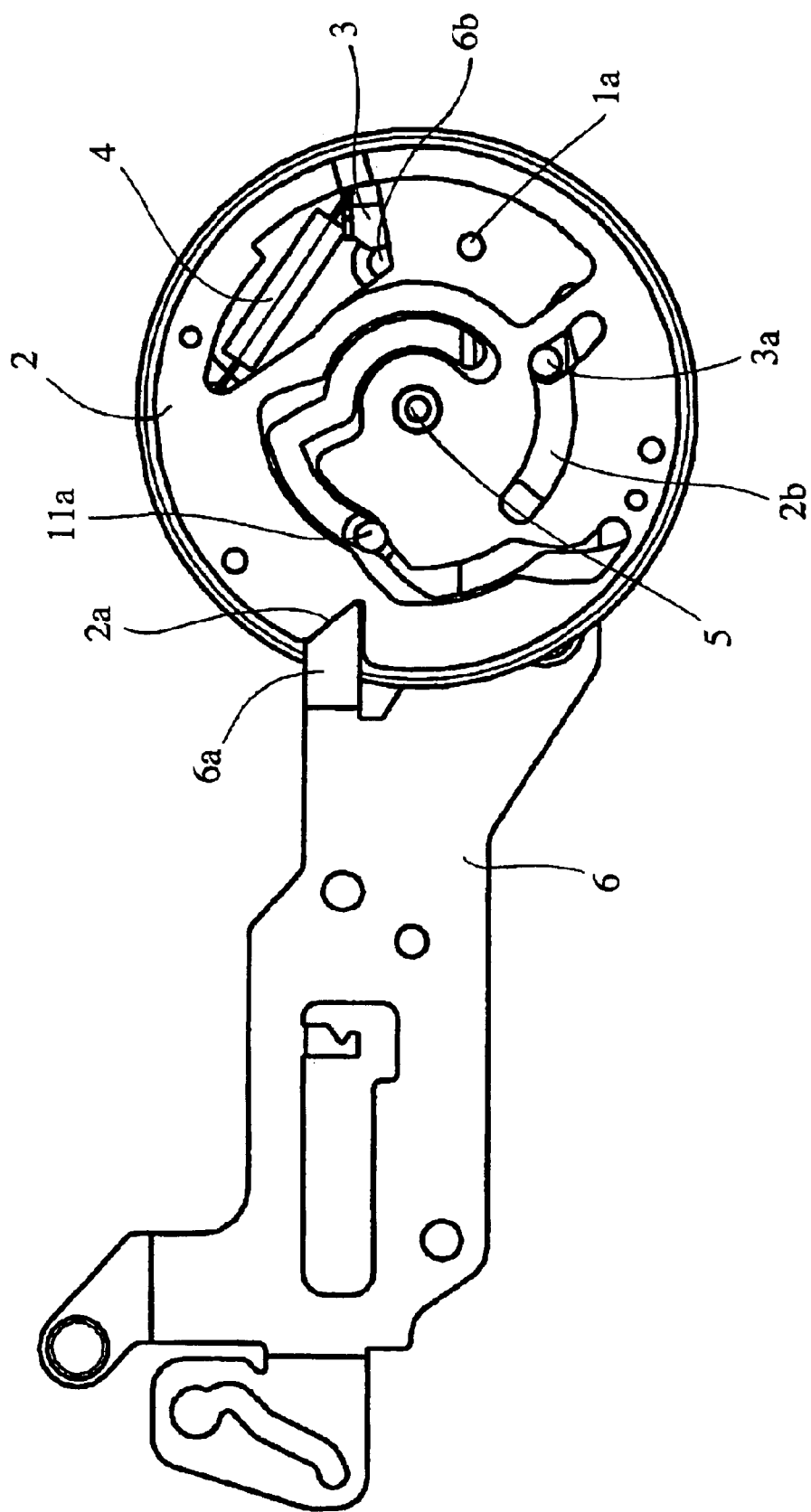
FIG. 12 is an explanatory diagram to show a state that the locking plate is slid and engaged with the sub cam plate from the state depicted in FIG. 9.
Figure 13:
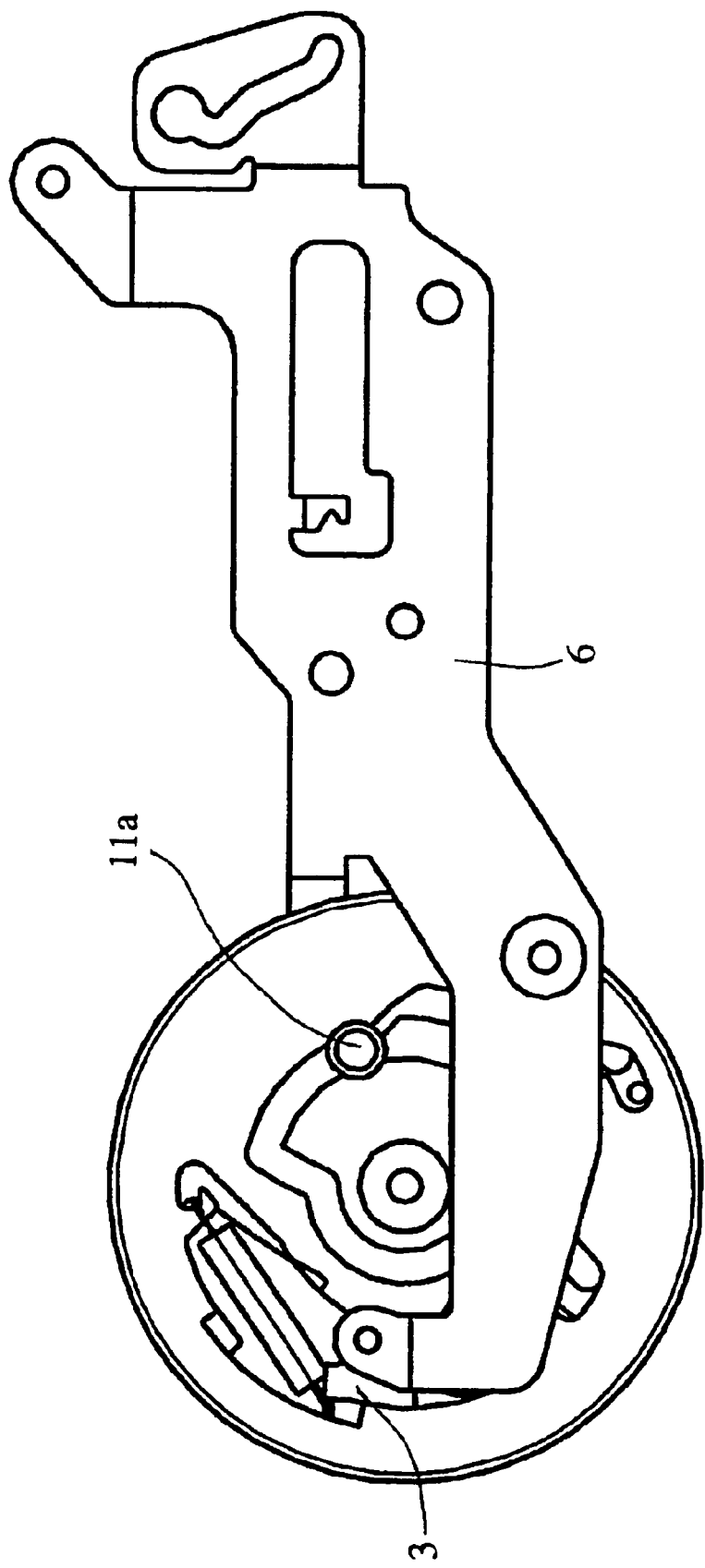
FIG. 13 is an explanatory diagram to show the state depicted in FIG. 12 when viewed from the back side.
Figure 14:
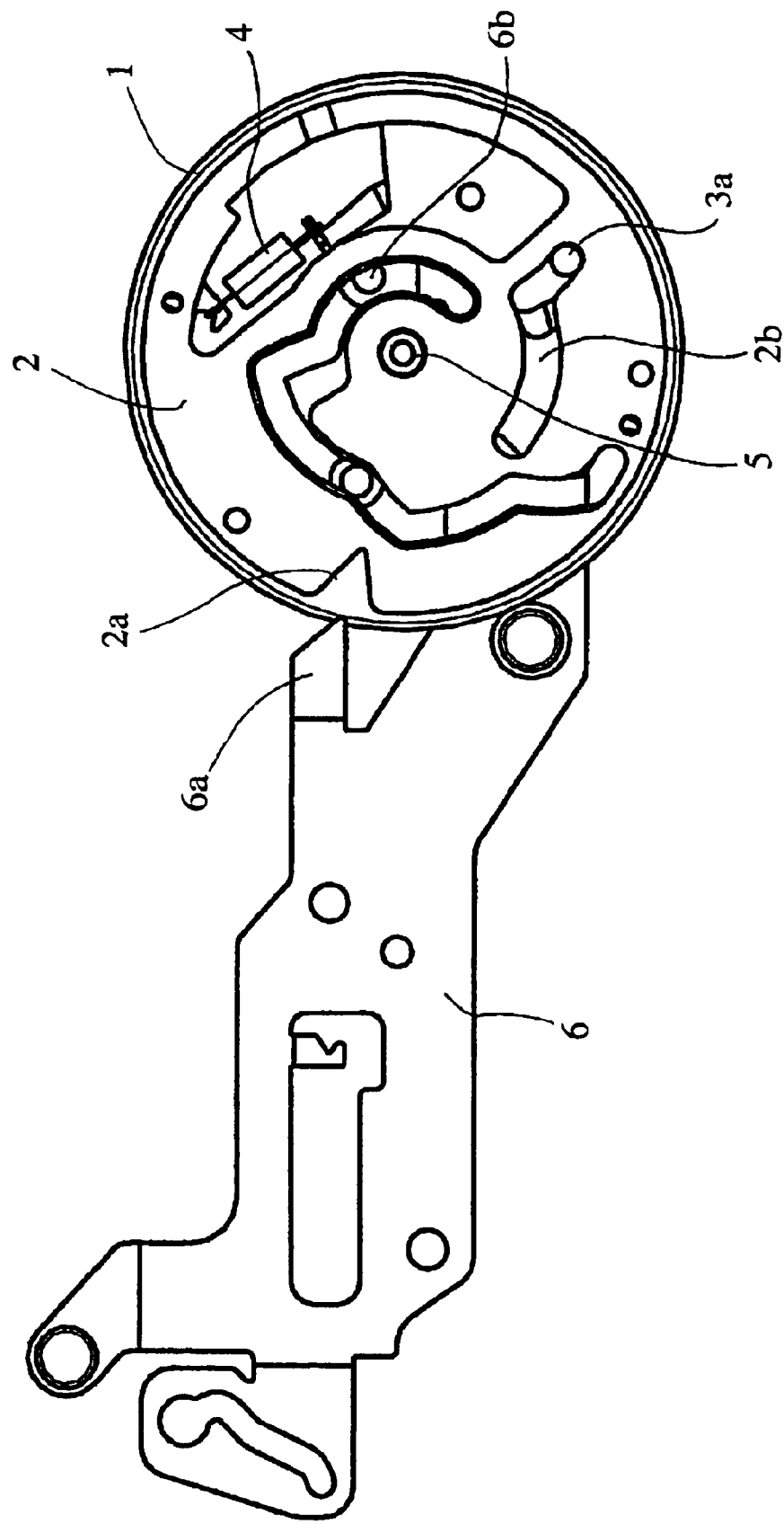
FIG. 14 is an explanatory diagram to show one example of setting for stopping position of a main cam plate.

Next FIG. 10 shows a state that a slanted edge of the protruding portion 6a of locking plate 6 and the precut portion 2a of sub cam plate 2 are aligned along a line, and FIG. 11 shows a back side of the state depicted in FIG. 10. Moreover FIG. 12 shows a state that the locking plate 6 is slid and engaged with the sub cam plate 2, and FIG. 13 shows a back side of the state depicted in FIG. 12.

In the state depicted in FIG. 10, when the locking plate 6 is slid, the sub cam plate 2 performs a rotating movement around the central axis 5 as a center till the precut portion 2a and the protruding portion 6a are matched. At this point a driving pin 11a of the lever 11 is located at a position in order not to disturb the rotating movement of sub cam plate 2. While this rotating movement is performed, the locking lever 3 performs its own rotating movement around central axis 5 as a center because the pin 3a engages with the cam groove 2b, and at the same time a rotating movement of the pin 6a of locking plate 6 is performed around the pin 1a as a center. By this movement while the sub cam plate 2 is in a state to stop the rotating movement, only the main cam plate 1 becomes rotatable within the concentric portion of cam groove 2b in the same manner as depicted in FIG. 8.

In this respect because the engagement of locking plate 6 onto the sub cam plate 2 can be performed within an area from a stopping position depicted in FIG. 6 to a stopping position depicted in FIG. 10, a stopping position of the main cam plate 1, while the engagement of locking plate 6 is performed, is set on an area of center between two positions that the straight edge of protruding portion of the locking plate and a precut portion of the sub cam plate are aligned along a line, and that a slanted edge of protruding portion of the locking plate and the precut portion of sub cam plate are aligned along a line.

Because the locking plate 6 is arranged as above described the locking action can be attained even when the rotational stopping position of the main cam plate 1 is shifted as far as it is located within the area between two stopping position depicted in FIG. 6 and FIG. 10.

And in a case when a lock releasing action is performed to release the engagement of locking plate 6, it is possible to be reset to the locking state depicted in FIG. 4 because the locking lever 3 is pulled back by the spring 4 regardless of rotational stopping position of the main cam plate 1.

By this arrangement it is made possible to absorb a stopping error caused by a control for stopping the motor 10, a stopping error of the main cam plate 1 caused by mechanical rattling or mechanical variation and the like.

Figure 15:
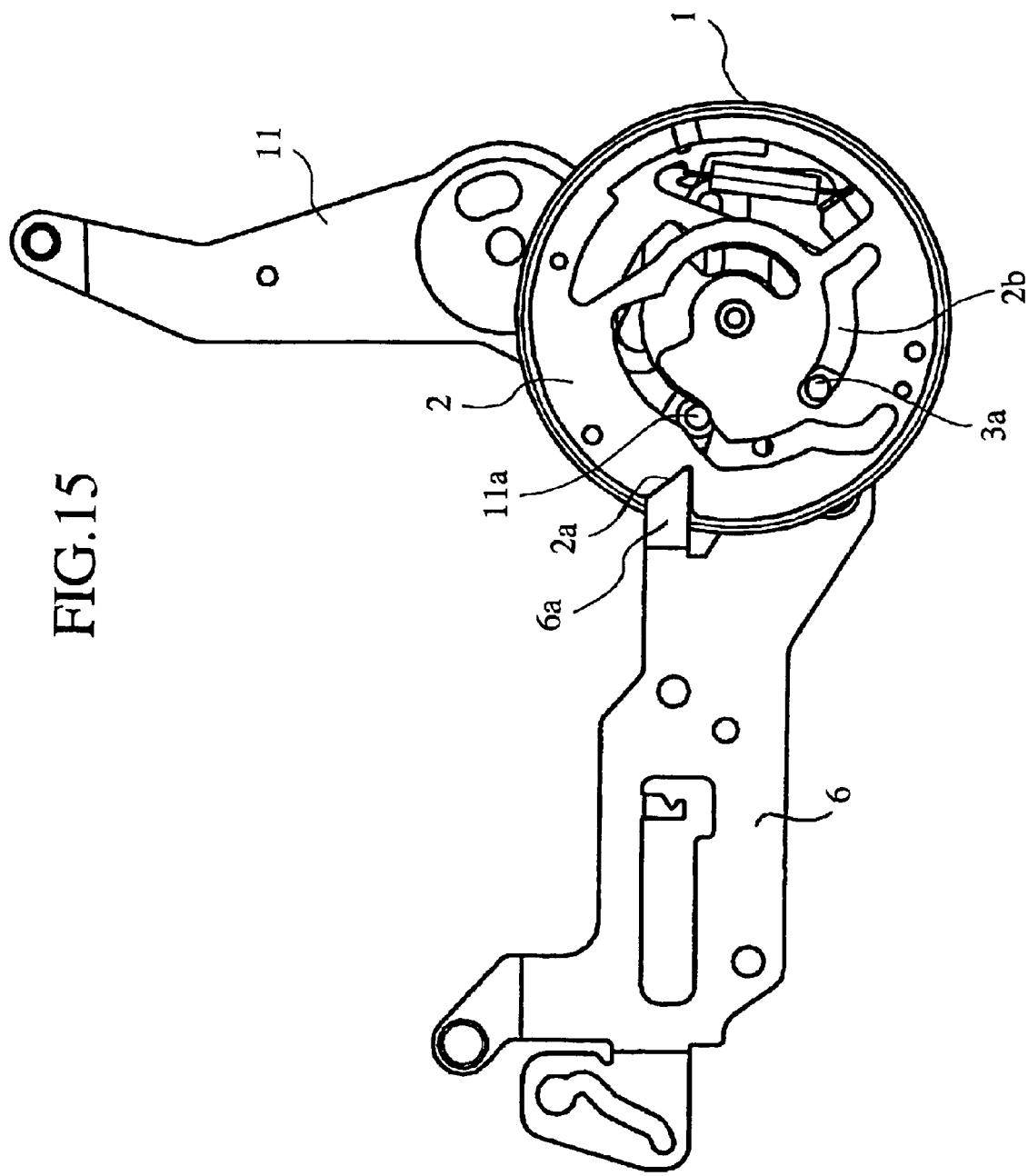
FIG. 15 is an explanatory diagram to show a state that the main cam plate rotates within a concentric portion of cam groove after the locking plate engages with the sub cam plate.
Figure 16:
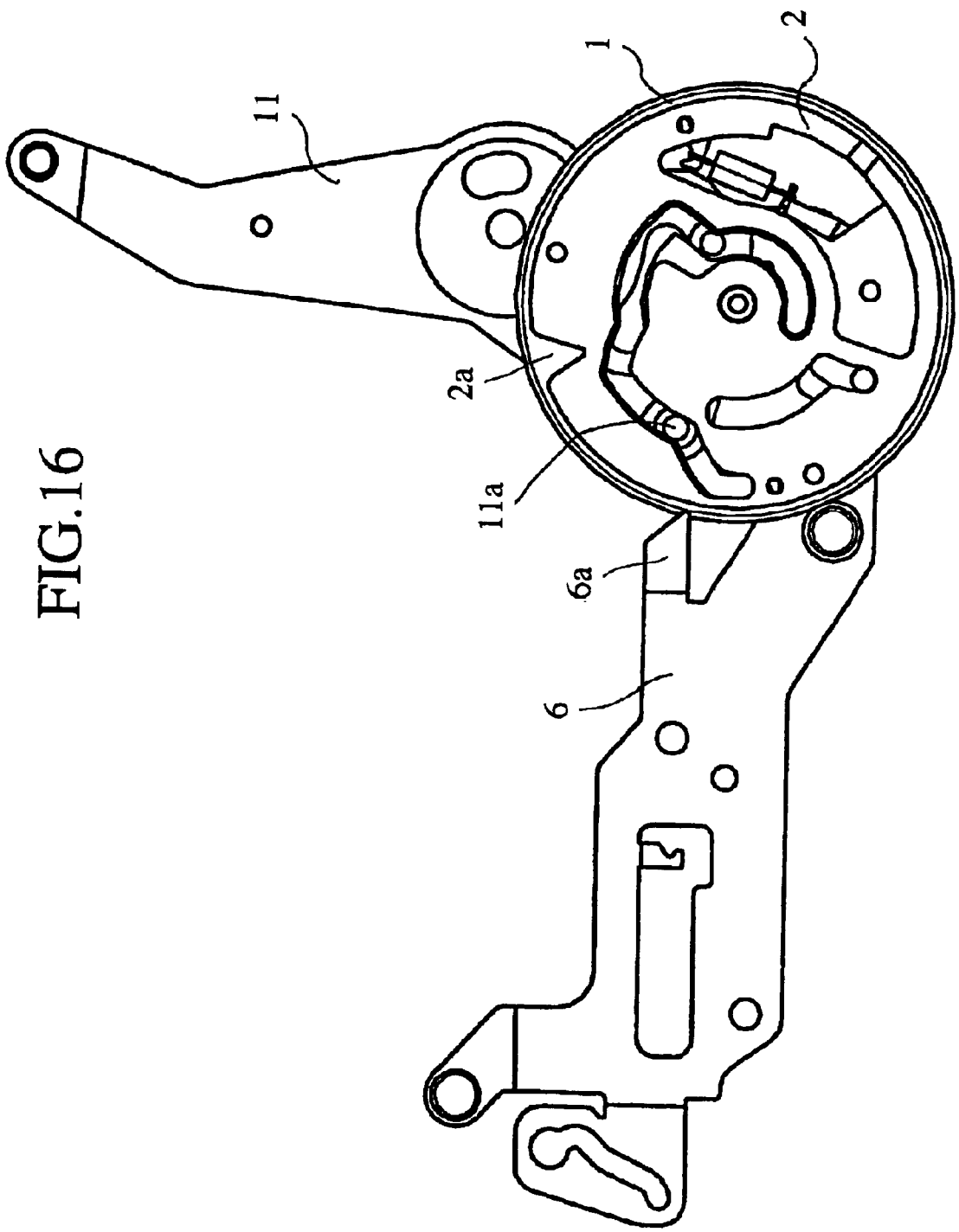
FIG. 16 is an explanatory diagram to show a state that the main cam plate rotates to the same position which is depicted in FIG. 15 when the locking plate has not engaged with the sub cam plate.

At this point FIG. 15 shows a state that the main cam plate 1 rotates within the concentric portion of cam groove 2b after the locking plate 6 engages with the sub cam plate 2. Because the rotating movement of sub cam plate 2 is prohibited, the pin 11a can not be moved and thereby the lever 11 is not worked FIG. 16 shows a state that the main cam plate 1 rotates to the same position which is depicted in FIG. 15 when the locking plate 6 does not engage with the sub cam plate 2. Because the sub cam plate 2 is rotated with the main cam plate 1, the pin 11a is moved to an outer peripheral side and thereby the lever 11 is worked.

By this constitution a selection from two different cam groove pattern can be performed within the same rotating area going along with allowance of stopping error of the main cam plate 1.

INDUSTRIAL APPLICABILITY

As set forth above, the disk device in accordance with the present invention is suitable for a disk device that selectively realizes the disk changing mode in which an arbitrary disk is selected from a plurality of disks and exchanged, and a disk playing mode in which an arbitrary disk is inserted into a slot and reproduce.

What is claimed is:

1. A disk device comprising:
   a main cam plate which is rotated by a driving means;
   a sub cam plate which is rotatably supported on the same axis as said main cam plate and a precut portion is made on a circumference thereof;
   an engaging means which makes said main cam plate and said sub cam plate engaged with each other;
   a lever which rotates with a rotating movement of said sub cam plate when said main cam plate and said sub cam plate are engaged together by said engaging means; and
   a locking plate which makes a protruding portion inserted into the precut portion on said sub cam plate to release engaging state of the engaging means when the sub cam plate stops at a predetermined rotated position, characterized by that
   the precut portion of said sub cam plate and the protruding portion of said locking plate are made in a slanted shape and at the same time said sub cam plate is rotated by a pressure when said protruding portion is inserted into said precut portion.

2. The disk device according to claim 1 characterized by that a stopping position of the sub cam plate is set such that a tip portion of the protruding portion is located at a central area of cut portion of the precut portion.

3. The disk device according to claim 1 characterized by that precut portion of the sub cam plate is made by cutting in a triangle shape, and the tip portion of protruding portion of the locking plate is made in a shape of acute angle.

4. The disk device according to claim 1 characterized by that a urging member which urges the sub cam plate in a direction that is opposite to the pressure when the protruding portion is inserted into the precut portion.

5. The disk device according to claim 4 characterized by that the urging member is constituted by a spring, and one end of the spring is firmly fixed onto the main cam plate and another end of the spring is firmly fixed onto the locking plate.

* * * * *